US012186778B2

(12) United States Patent
Ozbag

(10) Patent No.: US 12,186,778 B2
(45) Date of Patent: Jan. 7, 2025

(54) LASER LINE FOR USE IN HAZELNUT PROCESSING FACILITIES

(71) Applicant: BALSU GIDA SANAYI VE TICARET ANONIM SIRKETI, Sakarya (TR)

(72) Inventor: Nusret Ozbag, Sakarya (TR)

(73) Assignee: BALSU GIDA SANAYI VE TICARET ANONIM SIRKETI, Sakarya (TR)

( * ) Notice: Subject to any disclaimer, the term of this patent is extended or adjusted under 35 U.S.C. 154(b) by 0 days.

(21) Appl. No.: 18/563,391

(22) PCT Filed: Mar. 9, 2022

(86) PCT No.: PCT/TR2022/050207

§ 371 (c)(1),
(2) Date: Nov. 22, 2023

(87) PCT Pub. No.: WO2023/282867

PCT Pub. Date: Jan. 12, 2023

(65) Prior Publication Data

US 2024/0253081 A1 Aug. 1, 2024

(30) Foreign Application Priority Data

Jul. 5, 2021 (TR) ............................... 2021/010948

(51) Int. Cl.
*B07C 5/342* (2006.01)

(52) U.S. Cl.
CPC .................................. *B07C 5/342* (2013.01)

(58) Field of Classification Search
CPC ......... B07C 5/34; B07C 5/342; B07C 5/3422; B07C 5/3425
See application file for complete search history.

(56) References Cited

U.S. PATENT DOCUMENTS 4,697,709 A * 10/1987 Codding ................ B07C 5/366 250/226
5,986,230 A * 11/1999 Novak .................... B07C 5/365 209/579
7,290,665 B2 * 11/2007 Hunter ..................... A01C 1/00 209/939

FOREIGN PATENT DOCUMENTS

CN 206528661 U * 9/2017
CN 115193704 A * 10/2022
EP 1698888 A2 * 9/2006 ............. B07C 5/342
EP 2234736 A2 10/2010

(Continued)

*Primary Examiner* — Terrell H Matthews
(74) *Attorney, Agent, or Firm* — Bayramoglu Law Offices LLC

(57) ABSTRACT

A laser line is provided for providing separation of hazelnut from items thereof, which are not compliant to standard, in hazelnut processing facility. The laser line comprises at least one first detection module having at least one first detection unit for use in visual picking of hazelnut on said laser line, and at least one second detection unit provided at the continuation of said first detection unit and which provides keeping of the items, which are not suitable to standard and which are not kept by the first detection unit, by means of visual detection, and at least one second detection module provided at the continuation of said first detection module and which can provide keeping of the items, which are not suitable to standard and which exist in hazelnut, by detecting said items by means of laser scanning.

12 Claims, 1 Drawing Sheet

(56) References Cited

FOREIGN PATENT DOCUMENTS

| | | | | | |
|---|---|---|---|---|---|
| EP | 2234736 | B1 | * | 8/2015 | ............. B07C 5/342 |
| IT | BO20110437 | A1 | | 1/2013 | |
| JP | 2001524028 | A | * | 5/1998 | |
| JP | 2001321726 | A | * | 11/2001 | |
| KR | 20170014301 | A | * | 7/2015 | |
| WO | WO-0057160 | A2 | * | 9/2000 | ............. B07C 5/342 |

* cited by examiner

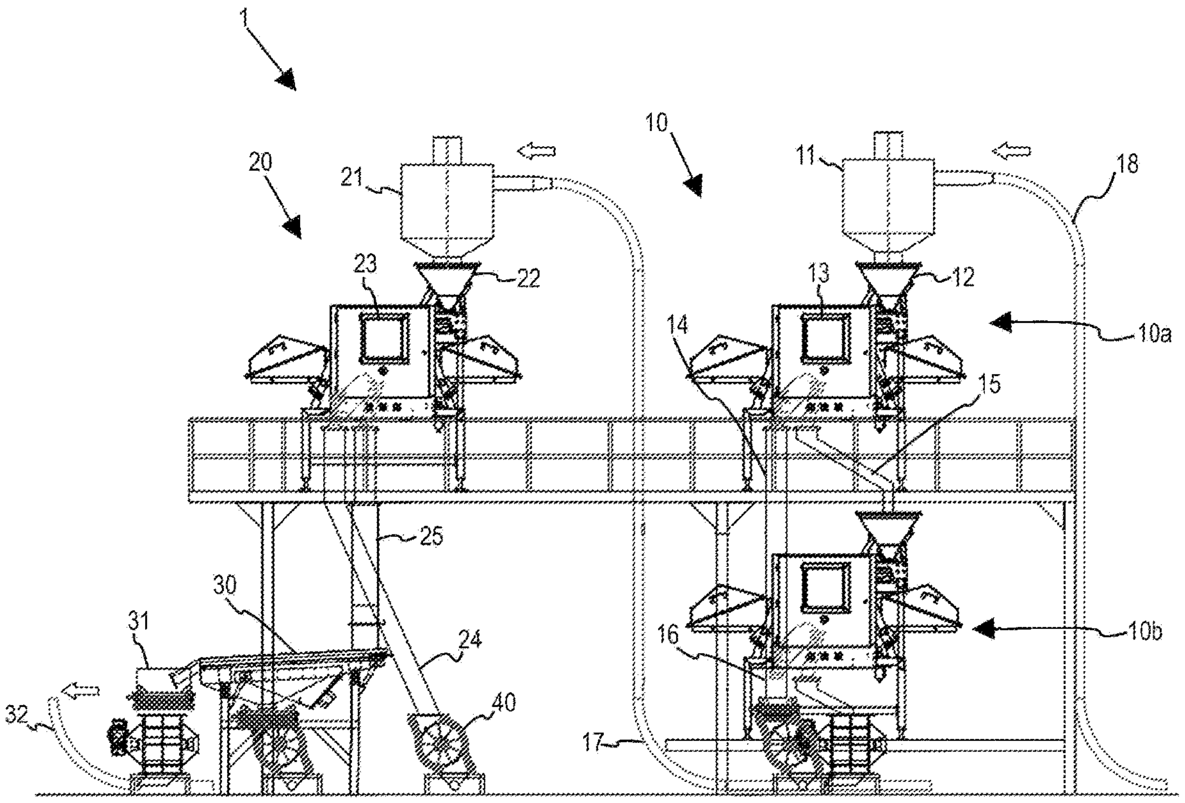
1
20
21
10
11
18
23
22
13
12
10a
14
15
25
30
31
24
40
32
16
10b
17

LASER LINE FOR USE IN HAZELNUT PROCESSING FACILITIES

CROSS REFERENCE TO THE RELATED APPLICATIONS

This application is the national phase entry of International Application No. PCT/TR2022/050207, filed on Mar. 9, 2022, which is based upon and claims priority to Turkish Patent Application No. 2021/010948, filed on Jul. 5, 2021, the entire contents of which are incorporated herein by reference.

TECHNICAL FIELD

The present invention relates to a laser line for providing separation of hazelnut from items thereof, which are not compliant to standard, in hazelnut processing facility.

BACKGROUND

Hazelnut processing facilities include process steps until turning unshelled hazelnut into decorticated hazelnut. These process steps can include breaking, cleaning and packaging of hazelnut. Hazelnut is presented to market after being subjected to breaking and cleaning processes in hazelnut processing facilities. Thus, facilities, which exist at close distance where hazelnut breaking and cleaning processes can be realized, are an important need for the hazelnut producer for presenting the product to the market without devaluation of the product.

There can be potential foreign substances and cheats which can exist together with the product because hazelnut is an agricultural-sourced product. Among the reasons of this can be filling hazelnut into big bags, carrying branches together with the hazelnut, mixing soil to the batch due to falling on the soil, mixing of broken parts, stones, garbage, dust and hollow grains and mixing of cheap foreign substances like hollow shell together with unshelled hazelnut. Besides these, even though the unshelled hazelnut, brought to the processing facility, is clean, it can be hollow or creased. The presence of such items in the hazelnut decreases the quality of the hazelnut and may lead to bad user experience. Against these, there are pluralities of structures which can realize picking in the art.

The application with no ITBO20110437A1 known in the literature relates to a hazelnut separation system. This invention particularly relates to a classification machine for grained materials. Particularly for separating granule products, it can realize optical picking. In accordance with this invention, the classification machine of granular material comprises a specific amount of granular material and comprises a feeding device of a granule material which has function of transferring to devices which realize material selection.

The application with no U.S. Pat. No. 4,697,709A known in the literature relates to an agricultural product separation system. The invention comprises pluralities of stations which have optical sensors. Optical sensors detect the light reflected from product flow which passes through the optical station and create the electrical signals which are the indicator of the detected light. The signals, coming from the optical sensors for each separate channel, are multiplied in an arrayed manner and is given to an electronic process circuit for comparison with a reference signal for determining whether the products are acceptable or not. If the product is not acceptable, the product is removed.

Even though picking systems are known in the art, a structure which can realize picking particularly for hazelnut is not known. Realization of visual picking by means of personnel before delivering to the end consumer is substantially costly and decelerates the process.

As a result, because of the abovementioned problems, an improvement is required in the related technical field.

SUMMARY

The present invention relates to a laser line, for eliminating the abovementioned disadvantages and for bringing new advantages to the related technical field.

An object of the present invention is to provide a laser line for use in hazelnut processing facilities. Another object of the present invention is to provide a laser line for use in separation of the foreign substances, which exist in hazelnut, by detecting said foreign substances by means of visual and laser scanning.

In order to realize the abovementioned objects and the objects which are to be deducted from the detailed description below, the present invention is a laser line for providing separation of hazelnut from items thereof, which are not compliant to standard, in hazelnut processing facility. Accordingly, the improvement is that the subject matter laser line comprises at least one first detection module having at least one first detection unit for use in visual picking of hazelnut on said laser line, and at least one second detection unit provided at the continuation of said first detection unit and which provides keeping of the items, which are not suitable to standard and which are not kept by the first detection unit, by means of visual detection, and at least one second detection module provided at the continuation of said first detection module and which can provide keeping of the items, which are not suitable to standard and which exist in hazelnut, by detecting said items by means of laser scanning. Thus, hazelnut is cleaned from the undesired items thereof in the best manner and is transferred to the next operation step in hazelnut processing facility.

In a possible embodiment of the present invention, the first detection module is essentially a nimbus-sourced picker. Thus, hazelnut is separated in a biometric manner.

In another possible embodiment of the present invention, at least one first cyclone is provided on the first detection module. Thus, hazelnut is kept in the first cyclone at least for a while before transferring of hazelnut to the first detection module.

In another possible embodiment of the present invention, at least one first laser bunker is provided on the first detection module. Thus, hazelnuts are applied to the first sensor one by one.

In another possible embodiment of the present invention, at least one first sensor is provided on the first detection module. Thus, hazelnut is separated in a biometric manner.

In another possible embodiment of the present invention, at least one first discharge way and at least one first transport way are provided on the first detection unit. Thus, the carried raw substance is categorized.

In another possible embodiment of the present invention, the second detection module is essentially a helius-sourced picker. Thus, hazelnut is separated from undesired items thereof by means of laser scanning.

In another possible embodiment of the present invention, at least one second cyclone is provided on the second detection module. Thus, hazelnut is kept in the second cyclone at least for a while before transferring of hazelnut to the second detection module.

In another possible embodiment of the present invention, at least one second laser bunker is provided on the second detection module. Thus, hazelnuts are applied to the second sensor one by one.

In another possible embodiment of the present invention, at least one second discharge way and at least one second transport way are provided on the second detection unit. Thus, the carried raw substance is categorized.

In another possible embodiment of the present invention, at least one third discharge way and at least one third transport way are provided on the second detection module. Thus, the carried raw substance is categorized.

In another possible embodiment of the present invention, at least one sieve is provided at the continuation of the second detection module. Thus, hazelnut is separated from small particles like dust.

In another possible embodiment of the present invention, at least one discharge conveyor and at least one clean product way are provided to which said sieve is connected. Thus, the carried raw substance is categorized in the final form.

BRIEF DESCRIPTION OF THE DRAWINGS

In the FIGURE, a representative lateral view of the subject matter laser line is given.

REFERENCE NUMBERS

1 Laser Line
10 First Detection Module
10*a* First Detection Unit
10*b* Second Detection Unit
11 First Cyclone
12 First Laser Bunker
13 First Sensor
14 First Discharge Way
15 First Transport Way
16 Second Discharge Way
17 Second Transport Way
18 Transport Pipe
20 Second Detection Module
21 Second Cyclone
22 Second Laser Bunker
23 Second Sensor
24 Third Discharge Way
25 Third Transport Way
30 Sieve
31 Discharge Conveyor
32 Clean Product Way
40 Air Lock

DETAILED DESCRIPTION OF THE EMBODIMENTS

In this detailed description, the subject matter is explained with references to examples without forming any restrictive effect only in order to make the subject more understandable.

In the FIGURE, a representative lateral view of the subject matter laser line (1) is given. Accordingly, said laser line (1) is used in hazelnut processing facilities. The hazelnut processing facility mentioned in the invention includes the process steps of transforming decorticated hazelnut from the unshelled hazelnut. The laser line (1) is used in detecting and eliminating external factors at least partially among the process steps of hazelnut.

The laser line (1) comprises at least one first detection module (10) and at least one second detection module (20) for providing detecting and separating foreign substances and non-standard hazelnuts which exist in hazelnut. Said first detection module (10) enables the carried hazelnut to be sensed in a biometric manner and to be separated. Said second detection module (20) enables the hazelnut to be sensed in a laser-sourced manner and to be picked. In a possible embodiment of the present invention, the first detection module (10) has two separate picking units which are similar to each other. By means of this, the hazelnut is picked twice, and the cleaning efficiency is improved.

The first detection module (10) is configured to essentially realize a nimbus-based detection. Said nimbus detection brings the solution of new generation free-fall picking. By means of nimbus sensing, products are separated according to visual characteristics like color and shape deviations in free fall. The first detection module (10) is nimbus-based, and thereby visual and formal picking is realized, and bruised hazelnuts, faulty (damaged) hazelnuts, mechanically damaged hazelnuts or galled grains are detected and separated. As mentioned, the first detection module (10) has two detection units which are adjacent to each other. Hereafter, these shall be referred to as the first detection unit (10*a*) and the second detection unit (10*b*).

There is at least one first cyclone (11) on the first detection module (10). Said first cyclone (11) is a chamber provided in a manner keeping hazelnut, taken from at least one transport pipe (18), at least for a while depending on the capacity of the first detection module (10). Said transport pipe (18) is a carrying element which can provide displacement of hazelnut between processing parts in hazelnut processing facility. The hazelnut, kept in the first cyclone (11), is transferred to at least one first laser bunker (12) as needed. Said first laser bunker (12) provides hazelnut to be applied in the same alignment to the vibrator channels (not shown in the FIGURES) provided on the first detection module (10). Hazelnut is applied to said vibrator channels after the first laser bunker (12) and to at least one first sensor (13) from there. In a possible embodiment of the invention, said first sensor (13) can be provided on the first detection module (10) so as to have pluralities of different characteristics. In a possible embodiment of the invention, the first sensor (13) can be a camera. Said camera has visual selectivity. Thanks to this, the hazelnut, taken from the first laser bunker (12), is scanned visually and the bruised, mechanically damaged and galled grains are picked. Afterwards, the refused, non-suitable products are selected and are transferred to at least one first discharge way (14). The selected and suitable products, except these, are transferred to at least one first transport way (15). Said first transport way (15) is essentially associated with the second detection unit (10*b*).

The first detection unit (10*a*) and the second detection unit (10*b*) realize essentially the same work with the same elements. The second detection unit (10*b*) provides selection of the non-suitable products which could not have been selected in the first detection unit (10*a*). As in the first detection unit (10*a*), there is the first laser bunker (12) and the first sensor (13) in the in the second detection unit (10*b*). By using these elements, the hazelnuts, taken from the first transport way (15), are controlled again. Afterwards, the refused products are removed from the laser line (1) by means of at least one second discharge way (16). The selected and suitable products, except these, are transferred to at least one second transport way (17). The hazelnut, taken from the second transport way (17), is transferred to the second detection module (20).

The second detection module (20) is essentially configured to realize detection by means of helius technology. Said helius detection essentially enables realization of optical picking by means of laser scanning. Helius technology is applied to the hazelnut processing line and the product quality is increased and as a result, picking is realized where undesired color deteriorations and foreign substances are eliminated. By means of this, best customer satisfaction is obtained. In order to increase operation efficiency by means of helius picking technology, modular adding and removing processes can be applied to the system as needed.

There is at least one second cyclone (21) on the second detection module (20). Said second cyclone (21) essentially has a similar operation principle as the first cyclone (11). The hazelnut is waited in the second cyclone (21) as in the first cyclone (11). Afterwards, the hazelnut is transferred from the second cyclone (21) to at least one second laser bunker (22). Said second laser bunker (22) is used in feeding hazelnut to the second detection module (20) in a regular manner. Afterwards, hazelnut is guided to at least one second sensor (23) provided on the second detection module (20). Pluralities of said second sensors (23) can be provided at the second detection module (20) in a manner having different picking characteristics. The second sensor (23) is used in detecting foreign substances which exist in hazelnut. In a possible embodiment of the present invention, the second sensor (23) is configured to realize laser sourced detection. By means of this, the second sensor (23) is used in detection of foreign substances which may exist in hazelnut. Said foreign substance can be an item like glass, bruised hazelnut, metal, etc. By means of this, the foreign substances which exist in hazelnut can be easily detected. The refused items, picked from hazelnut, are removed from the laser line (1) by means of at least one third discharge way (24). The hazelnut selected in a suitable manner from the second detection module (20) is transferred to at least one sieve (30) by means of at least one third transport way (25).

Said sieve (30) has a predetermined hole width. By means of this, hazelnut is passed through the sieve (30) and the small-dimensioned foreign substances, if any, are picked again. There is at least one discharge conveyor (31) at the output section of the sieve (30). Said discharge conveyor (31) removes the refused product, taken from the sieve (30), from the laser line (1). There is moreover at least one clean product way (32) at the output section of the sieve (30). Said clean product way (32) is the part where the suitable hazelnut, obtained finally, can be provided from the laser line (1). The hazelnut, taken from this clean product way (32), can be transferred to the next operation step.

In the invention, said first discharge way (14), said second discharge way (16) and said third discharge way (24) are connected to at least one each air locks (40). Said air lock (40) enables easily diverging of the hazelnut from the laser line (1) by means of the air lock (40).

By means of all these embodiments, foreign substances of the unshelled or decorticated hazelnut taken to the laser line (1) are separated. While doing this, since there are similar types of first detection unit (10*a*) and second detection unit (10*b*) in the first detection module (10), repetitive visual picking is applied to hazelnut. Afterwards, the second detection module (20) provides removal of foreign substances like glass, metal, etc. which can exist in hazelnut. The sieve (30) which exists afterwards provides contribution to picking of small particles like dust, soil, etc. which exists in the hazelnut. By using this laser line (1), hazelnut can be picked in a manner suitable to the desired conditions for the end consumer.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A laser line for providing a separation of hazelnut from items thereof in a hazelnut processing facility, wherein the laser line comprises:

a first detection module having a first detection unit for use in visual picking of hazelnut on the laser line, and a second detection unit provided at a continuation of the first detection unit, wherein the second detection unit provides keeping of the items, the items are not suitable to standard and the items are not kept by the first detection unit, by means of a visual detection, and a second detection module provided at a continuation of the first detection module, wherein the second detection module is allowed to provide keeping of the items, the items are not suitable to standard and the items exist in hazelnut, by detecting the items by means of laser scanning, and wherein a first cyclone is provided on the first detection module.

2. The laser line according to claim 1, wherein the first detection module is a nimbus-sourced picker.

3. The laser line according to claim 1, wherein a first laser bunker is provided on the first detection module.

4. The laser line according to claim 1, wherein a first sensor is provided on the first detection module.

5. The laser line according to claim 1, wherein a first discharge way and a first transport way are provided on the first detection unit.

6. The laser line according to claim 1, wherein a second discharge way and a second transport way are provided on the second detection unit.

7. The laser line according to claim 1, wherein the second detection module is a helius-sourced picker.

8. The laser line according to claim 1, wherein a second cyclone is provided on the second detection module.

9. The laser line according to claim 1, wherein a second laser bunker is provided on the second detection module.

10. The laser line according to claim 1, wherein a third discharge way and a third transport way are provided on the second detection module.

11. The laser line according to claim 1, wherein a sieve is provided at a continuation of the second detection module.

12. The laser line according to claim 11, wherein a discharge conveyor and a clean product way are provided where the sieve is connected.

* * * * *